[11] 3,602,686

[72] Inventor Joseph Lempert
 Pittsburgh, Pa.
[21] Appl. No. 630,135
[22] Filed Apr. 11, 1967
[45] Patented Aug. 31, 1971
[73] Assignee Westinghouse Electric Corporation
 Pittsburgh, Pa.

[54] ELECTRON-BEAM APPARATUS AND METHOD OF WELDING WITH THIS APPARATUS
 13 Claims, 20 Drawing Figs.
[52] U.S. Cl. .................................................. 219/121,
 250/49.5, 250/65, 313/60, 313/330
[51] Int. Cl. .................................................... B23k 9/00
[50] Field of Search............................................ 250/49.5,
 84.5, 226; 313/60, 55, 330; 219/69, 121

[56] References Cited
 UNITED STATES PATENTS
| | | | |
|---|---|---|---|
| 2,883,544 | 4/1959 | Robinson | 250/49.5 |
| 3,092,727 | 6/1963 | Leinhos et al. | 250/226 |
| 2,899,556 | 8/1959 | Schopper et al. | 250/49.5 |
| 2,993,996 | 7/1961 | Meyerhof | 313/61 |
| 3,149,257 | 9/1964 | Wintermute | 250/99 |
| 3,221,133 | 11/1965 | Kazato et al. | 219/69 |
| 3,373,278 | 3/1968 | Cilyo | 250/49.5 |

*Primary Examiner*—Archie R. Borchelt
*Assistant Examiner*—A. L. Birch
*Attorneys*—A. T. Stratton and Z. L. Dermer ABSTRACT: Electron-beam welding apparatus, particularly for welding work in the atmosphere outside of the vacuum chamber 33 (FIG. 1 in which the electron-beam is generated, which includes facilities for producing X-rays for monitoring of the welds. Such X-rays are produced by projecting the electron beam which serves for welding on an X-ray target 61 at intervals (FIGS. 2, 2A) during the welding operation or during an interval following the welding (FIG. 1); the X-rays may also be produced by deflecting the welding electron beam at intervals on the target (FIG. 5) or by an auxiliary beam generated within the same container as the welding beam (FIG. 4). Where there is an auxiliary beam, the X-ray monitoring of the weld may take place continuously as the welding progresses.

A method of welding with an electron beam in which the welds are monitored by radiographic analysis while the welding is progressing.

An X-ray generator 171 (FIG. 6) in which an electron beam E, which is projected outside of the vacuum chamber in which the electron-beam is generated, produces X-rays by impinging on a consumable target 191 preferably of relatively small dimensions.

PATENTED AUG 31 1971

WITNESSES
Theodore F. Wrobel
James F. Young

INVENTOR
Joseph Lempert
BY Zygmund L. Herner
ATTORNEY

PATENTED AUG31 1971 3,602,686

ELECTRON-BEAM APPARATUS AND METHOD OF WELDING WITH THIS APPARATUS

CROSS-REFERENCE TO RELATED APPLICATIONS

U.S. Pat. No. 3,418,526, granted Dec. 24, 1968 to Harold C. Simon and Bernard V. Gerber for Power Supply Apparatus discloses electron-beam-generating apparatus including a high-voltage power supply system which is combined integrally with the electron-beam generator. It is contemplated that in the practice of this invention the apparatus disclosed in the said application will be used.

BACKGROUND OF THE INVENTION

This invention relates to the art of generating and utilizing electron-beam apparatus and has particular relationship to electron-beam welding apparatus and methods practiced with such apparatus. In electron-beam welding apparatus, an electron beam usually of substantial power is generated in an evacuated chamber and serves to produce a metallurgical joint in work on which the beam impinges in welding relationship. Typically, the work is advanced in welding relationship with the beam and the metallurgical joint is produced progressively as the work is moved. The welding which is carried out in this way is typically fusion welding were the parts to be welded are joined by fusing the material of the parts themselves at the joint. Welding in which a filler material is added is also within the scope of this invention. The work may be advanced within the evacuated chamber in which the beam is produced or in the atmosphere outside of this chamber. In the latter event, the beam is projected through apertures communicating between the evacuated portion of the chamber and the outside atmosphere. Typical of electron-beam apparatus for welding in the atmosphere outside of the chamber in which the beam is generated is the apparatus disclosed in Schopper U.S. Pat. No. 2,899,556. This invention has unique applicability to welding in which the work is in the atmosphere outside of the chamber but it is also applicable to welding in which the work is within the chamber and to the extent that this invention is applicable to welding work within the evacuated chamber such practice of this invention within the scope of this application.

Predominantly, electron-beam welding is used in situations where the soundness of the welds is of vital importance. In accordance with the teachings of the prior art, the soundness of each weld produced is determined by testing and by radiographic examination after the welding is completed. This practice has proved costly because frequently unsound welds are encountered after a complete assembly has been fabricated and it is necessary to repeat the whole operation.

It is an object of this invention to overcome the above-described disadvantage of the prior art practice and to provide apparatus and a method for monitoring the welds produced by electron-beam welding during the welding operation as the welds are produced so that the conditions under which the welds are produced may be changed on the manifestation, by the monitoring, of porosity or other defects.

An incidental object of this invention is to provide X-ray generating apparatus particularly suitable for monitoring of the soundness of the welds produced by electron-beam welding but having other important uses.

SUMMARY OF THE INVENTION

In accordance with this invention, the welds are monitored as they are produced, and before the assembly fabricated is removed from he apparatus, by X-rays derived, during the welding, from the electron beam which welds the work, or from a related auxiliary electron beam. Specifically, each weld of an assembly may be monitored soon after it intensity produced by generating X-rays with the electron beam which produces the weld. For this purpose, after each weld is produced, a target of X-ray generating material is interposed between the electron-beam generator and the work and the intensity of the electron beam is reduced and projected onto the target to generate the X-rays. The welded joint is then subjected to the X-rays emitted by the target, for example, by passing the joint through the generated X-rays cones and the resulting X-rays from the joint are imaged on an X-ray film which may be immediately developed or on an X-ray image amplifier (FLUREX image amplifier). The monitoring is effected by scrutinizing the image on the film or through the microscope of the image amplifier. In accordance with this invention, the target is a wire of X-ray target material on the tip of which the beam impinges. For this purpose a fine wire is used in accordance with this invention so that the source of the X-rays is substantially a point source facilitating the observation of the X-ray image of the welded joint. The quality of the radiographic image is improved because a point source produces a sharp image.

In accordance with this invention the X-ray monitoring is also carried out progressively as the welding takes place. For this purpose an X-ray target is intermittently interposed in the path of the welding electron-beam for so short intervals of time that the brief interruption of the welding during each interval does not deleteriously affect the welding process. Typically, the X-ray target material may be provided on the teeth of a toothed disk which is rotated at substantial speed with the teeth successively passing through the welding beam, each for a short interval. The X-rays in the target material are transmitted through the region of the weld which was produced just prior to the injection of each target tooth into the beam and provide an X-ray image either on a film or on a FLUOREX amplifier of the section of the weld just produced.

During the welding operation the beam which produces the welding, in impinging on the joint to be welded also produces X-ray radiation. Unmodified this X-ray radiation is not suitable for producing useful monitoring images. In accordance with this invention, a pinhole screen is interposed between, the X-ray radiation from the weld produced by the welding electron-beam itself, and an imaging device such as a film. The pinhole image of the X-rays produced in this way yields a useful indication of the quality of the weld being produced for monitoring purposes.

In accordance with a further aspect of this invention the electron-beam-generating apparatus provides a pair of electron beams, one for welding and the other for producing an X-ray image. Where the intensity demanded for producing suitable X-rays for monitoring the welds is generated by a beam of smaller intensity than the welding beam the X-ray image beam is of smaller intensity than the welding beam. The welding beam and the X-ray producing beam are aligned. A target of X-ray material, for example, a wire of small diameter, is interposed in the path of the X-ray producing beam. The alignment of the electron beams is along the direction of welded joint as it is produced and is such that the work passes through the X-rays emitted by the target after it is welded. The distance between the point where the welding beam impinges on the work in welding relationship and the X-rays is such that the region welded has solidified before it is impinged by the monitoring X-rays. The image of the X-rays produced is observed and the welding of the work is progressively monitored.

A like process is carried out by utilizing a single beam both for welding and for X-ray monitoring but during short intervals of time deflecting the welding beam so that it impinges on an X-ray target. The intervals are so short that the quality of the welding is not deleteriously affected by the interruption of the welding during these intervals. The deflected position of the beam is so disposed with reference to the welding position that the work is welded and has time to solidify before passing under the X-rays emitted by the target.

In accordance with another aspect of this invention highly effective X-ray generating apparatus is provided. This apparatus includes an attenuated target in the form of a consumable wire or ribbon or sharp needle outside of the evacuated space in which the electron beam is generated. The electron beam passes out of this space through apertures and impinges on the target. The X-ray beam impinging on this target produces substantially a point source of X-rays which are readily used to produce images of the work being monitored. Where the electron-beam energy is substantial, the target is consumed but may continuously renewed by advancing means which continuously feeds the target into X-ray generating relationship with the beam.

BRIEF DESCRIPTION OF THE DRAWING

For a better understanding of this invention, both as to its organization and as to its method of operation together with additional objects and advantages thereof, reference is made to the following description taken in connection with the accompanying drawings, in which.

description OF THE PREFERRED EMBODIMENTS

Figure 1:
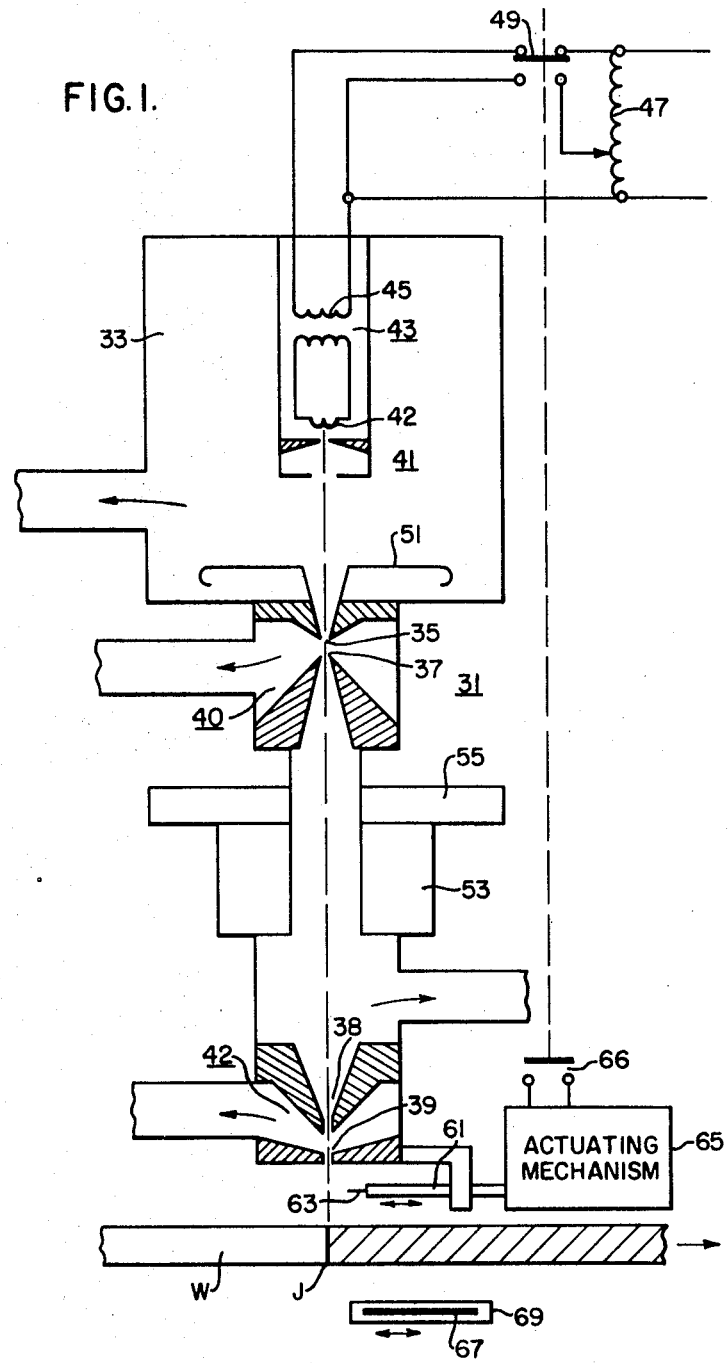
FIG. 1 is a diagrammatic view showing electron-beam welding apparatus in accordance with this invention in which a single beam serves for welding and for X-ray monitoring.

The apparatus shown in FIG. 1 includes an electron-beam generator 31. This generator 31 may be of the type disclosed in Schopper U.S. Pat. No. 2,899,556 or U.S. Pat. No. 3,418,526.

The electron-beam generator 31 has a plurality of pairs of apertures 35 and 37 and 38 and 39; each pair including an entrance aperture 35 and 38 and an exit aperture 37 and 39 and defining a chamber 40 and 42 respectively between the apertures. The chambers 40 and 42 are evacuated by separate pumps (not shown). The exit aperture 39 and the chamber 42 are at the end of the generator 31 remote from the cathode.

This generator 31 includes a cathode 41 having a filament 42 which is heated through a transformer 43. The primary 45 of this transformer is supplied through a variable transformer 47 which by operation of a switching mechanism 49, which may be a contact of a relay, may be set for high current, for normal welding operation, and for low current for X-ray monitoring. The generator 31 also includes an anode 51. A high accelerating potential for the electrons emitted from the cathode 41 is impressed between the anode 51 and the cathode producing the beam. The beam is focused by a magnetic lens 53 and by the electrostatic field between anode 51 and cathode 41 and may be aligned by a deflecting coil 55. The generator 31 includes a plurality of pumps (not shown) which evacuate the space 33 between the anode 51 and the cathode 41, the respective spaces or regions in which the aperture pairs 35–37 and 38–39 are present, and space between the aperture pairs. On leaving the exit aperture 39 of the exit pair 38–39 the beam impinges on the work W which includes parts forming a butt joint J which is to be welded. In FIG. 1, the electron beam is shown impinging on the joint J in welding relationship with the joint, and the work W is moved by means (not shown) in to the right in the plane of the drawing so that the joint is welded.

For X-ray monitoring of the work, the apparatus shown in FIG. 1 includes a wire target 61, the tip 63 of which is movable into and out of X-ray generating relationship with the beam. The target wire 61 may be composed of a suitable high-atomic-number metal such as tungsten or tantalum or the like. Provisions (not shown) may be included for assuring that the tip 63 of the target is in the path of the beam as the target is consumed during use. The movement of the target is controlled by an actuating mechanism 65 which is controlled by a switch or relay contact 66 that may be operated together with the switch 49 which reduces the cathode current, so that the movement of the target wire and the reduction of the current take place simultaneously. Below the work an X-ray film 67 is provided in an X-ray cassette 69. Where it is desired to monitor the weld by viewing the X-ray image the film may be replaced by a FLUREX image amplifier. The film remains fixed relative to the work (the work and X-ray beam are moved relative to each other) but the image amplifier remains fixed relative to the X-ray beam.

In the use of this apparatus, the weld is produced with the heating current supplied to the filament 42 at a high magnitude and the target wire 61 retracted. After the welding is completed, the switch 49 for controlling the filament current is opened and the switch for advancing the X-ray target into X-ray generating relationship with the electron beam is closed. The cathode current is then reduced to the X-ray generating magnitude and at the same time the target is interposed in the beam. The work may be reversed by a drive (not shown) and an X-ray image produced to determine if a sound weld has been produced.

Figure 2:
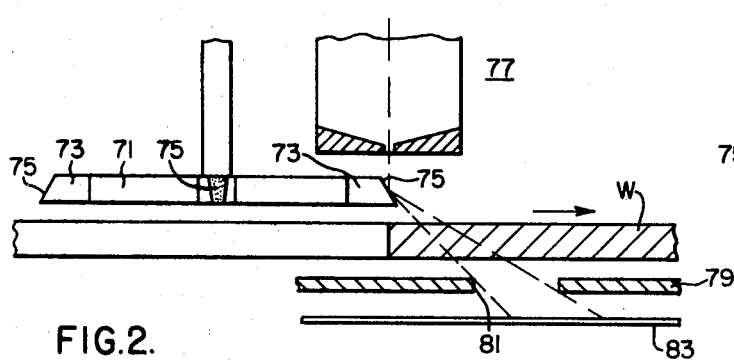
FIG. 2 is a fragmental diagrammatic view showing electron-beam apparatus in accordance with a modification of this invention in which a single beam serves for welding for intermittent X-ray monitoring.
Figure 2A:
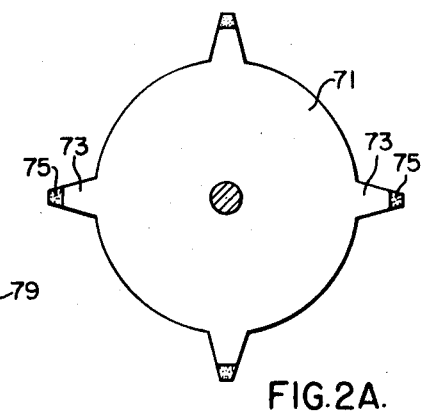
FIG. 2A is a view in plan of the target wheel of the apparatus shown in FIG. 2.

The apparatus shown in FIGS. 2 and 2A serves for X-ray monitoring the work W as it is welded. This apparatus includes a target wheel 71 having a plurality of peripheral projections 73 which are tipped with X-ray target material 75. This wheel is rotated by a motor (not shown) so that the target tips 75 are periodically injected into the path of the electron beam which emerges from the electron-beam generator 77. The geometrical configuration of the X-ray target material tips 75 are such that the X-rays generated by the beam pass through the work W at a position at which the weld produced in the work has had time to solidify. Below the work W there is a shield 79 of a material such as lead having an aperture 81 and below the shield there is an X-ray film 83 or other X-ray viewing apparatus positioned so as to receive the X-rays which pass through the aperture 81. The shield is so positioned that the portion of the work which is viewed is that portion which has been welded and has had time to solidify.

The speed of the X-ray disk 71 is such that the X-ray tips 75 interrupt the welding beam only for intervals of time that are so short that the welding is not deleteriously affected by the interruption. The intervals of the time must be set taking into consideration the speed of movement of the work W and its conductivity and must be so short that the weld produced is continuous and that the temperature of the region which is being welded before and after each interruption does not materially change by reason of the interruption. The cathode current of generator 77 which produces the electrons for the beam may be reduced in synchronism with the movement of the X-ray target disk in situations in which such reduction is desirable.

Figure 3:
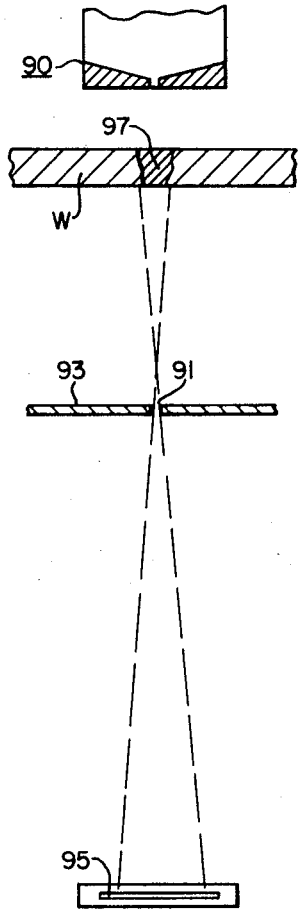
FIG. 3 is a diagrammatic fragmental view showing a modification of this invention in which the X-rays emitted from the weld region serve for monitoring.

In the modifications shown in FIG. 3, the X-rays produced during the actual welding, with the electron beam from the generator 90, which are emitted in all directions from the work W are imaged through a pinhole 91 in a lead or tantalum screen 93 onto the film 95. An image of the welded mass 97 as it is being formed is thus produced. This image is useful in determining what is happening during the welding operation. To aid in the understanding of the welding operation, a high speed motion picture may be produced in this way.

Figure 4:
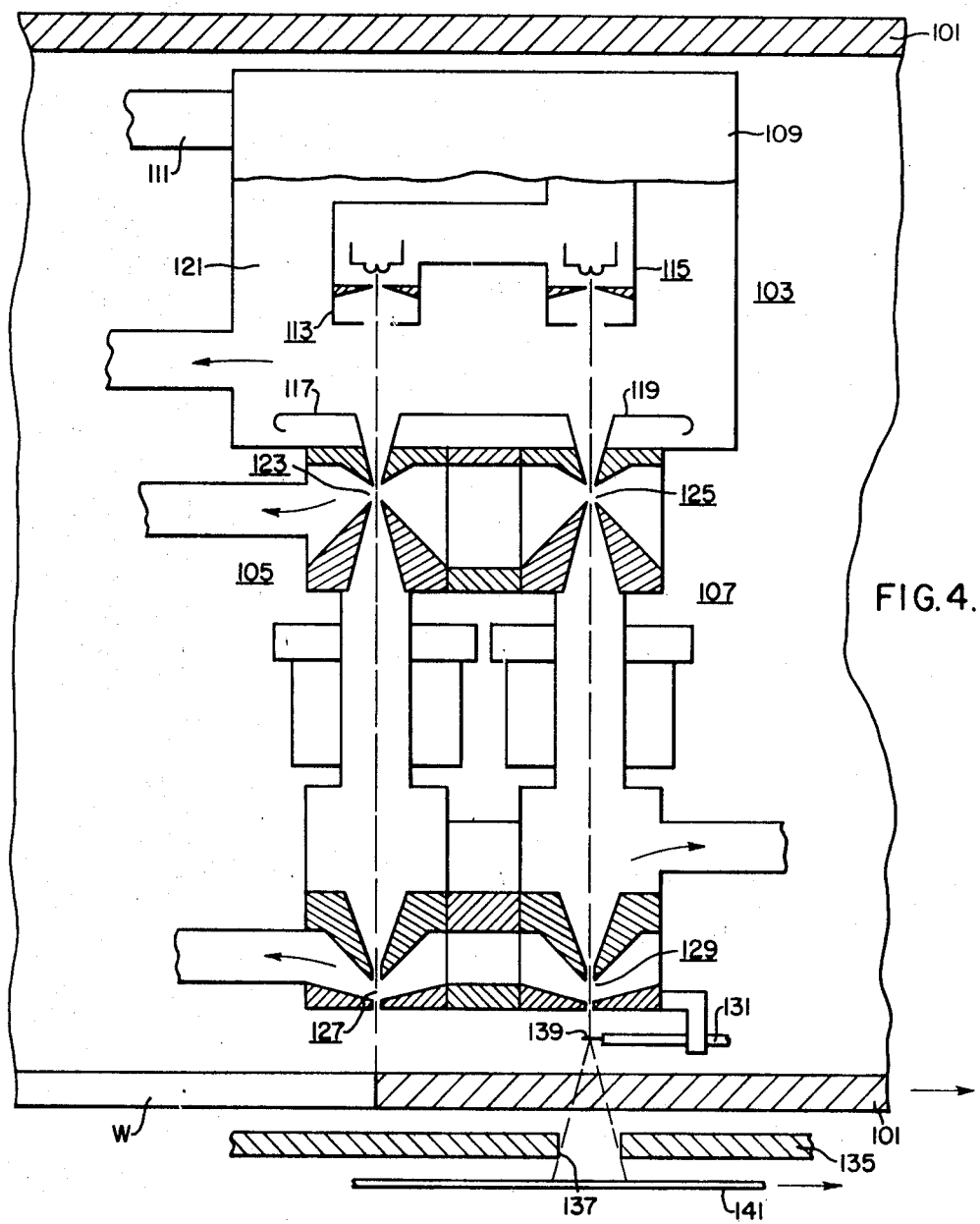
FIG. 4 is a diagrammatic view showing electron-beam welding and weld monitoring apparatus in accordance with a modification of this invention in which the electron-beam-generating apparatus generates separate beams for welding and for monitoring.

In FIG. 4 the electron beam and X-ray monitoring apparatus is shown as applied to the welding of a conduit 101 of large diameter, for example, of about 3 feet. In this case an electron-beam generating system 103 is provided which includes a pair of electron-beam generators 105 and 107, one, 105, of high power for welding and the other, 107, of lower power for monitoring. These generators are energized from a common power converter 109 which is of the type shown in the Simon-Gerber U.S. Pat. No. 3,418,526.

The electron-beam generator system 103 is suspended within the conduit 101 from a conductor 111 which carries the low-voltage cable to the power converter 109. The electron beams are derived from a pair of cathodes 113 and 115, typically of the bolt type which together with their anodes 117 and 119 are mounted within a common chamber 121 which is evacuated by pumps (not shown) connected to the chamber 121 by a tube passing through the conduit 101. The electrons from each cathode 113 and 115 are accelerated by the potential applied between the cathode and the associated anode 117 an 119 and the resulting beam is transmitted through entrance and exit apertures pairs 123 and 125 and 127 and 129. Common pumping systems (not shown) evacuates the spaces between the apertures pairs 123 and 125 and 127 and 129.

The high-power beam impinges directly on the work W which in this case is the joint formed by the edges of the conduit 101 to be welded together. In the path of the other beam a target 131 of X-ray target material is interposed. The conduit 101 is advanced and the electric-beam generators 105 and 107 are aligned along the conduit so that as the conduit advances the joint is first welded and thereafter is subjected to X-rays.

An X-ray shield 135 of lead or other suitable material having an aperture 137 therein is disposed on the outside of the conduit 101 just below the joint. The aperture is aligned with the tip 139 of the X-ray target wire 131 so that the X-rays from the target wire transmitted through the joint are also transmitted through the aperture 137. A viewing device or film 141 is mounted below the shield 135 so as to receive the imaging X-rays from the work which passes through the aperture 137. The shield 135 prevents unwanted X-ray produced in the weld region from impinging on the film. The viewing device 141 and the conduit are moved together. The welding and X-ray-monitoring electron beams are so spaced that when the work reaches the X-rays emitted by the target 131 it has solidified sufficiently for radiographic examination.

Figure 5:
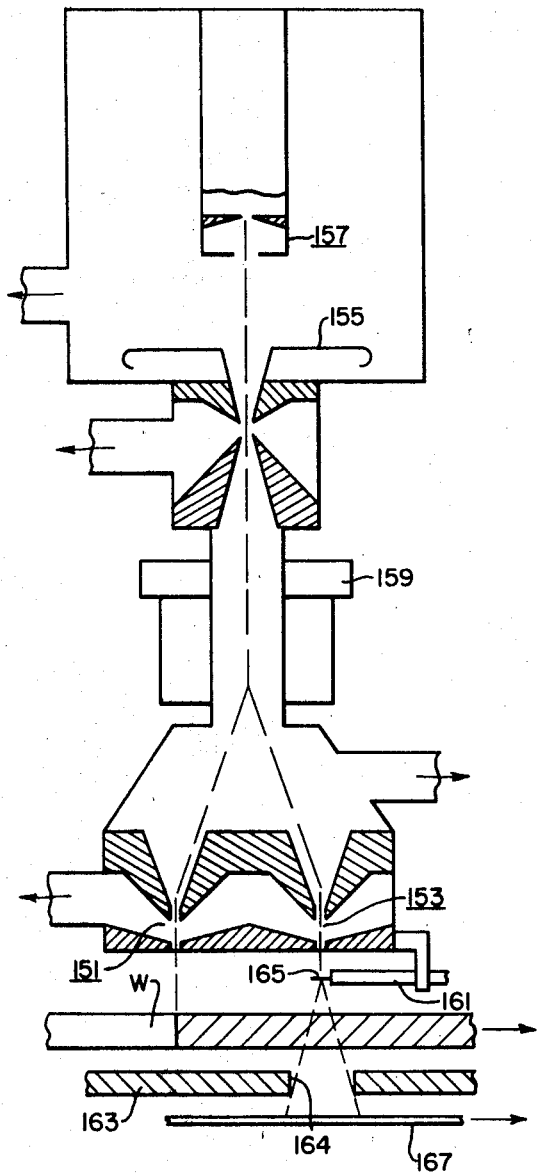
FIG. 5 is a diagrammatic view showing still another modification of this invention in which the welding beam is intermittently deflected to produce X-rays for weld monitoring.

FIG. 5 discloses an electron-beam generator with two sets of exit-aperture pairs 151 and 153, one, 151, on one side of the axis defined by the anode 155 and the cathode 157 and the other, 153, on the other side. By applying appropriate deflecting potential to the deflecting coil 159 the beam may be deflected between these exit aperture pairs 151, 153. The welding is carried out with the beam deflected to the aperture pair 151. Below the exit aperture pair 153, a wire X-ray target 161 is disposed. The beam is deflected at intervals to impinge on this target producing the X-rays for monitoring. During the deflection the beam may be interrupted by bias.

The work W is advanced under the beams. The welding beam is disposed in the direction from which the work is advancing and the X-ray beam and the target 161 are disposed in the direction towards which the work is moving. The spacing between the welding exit aperture pair 151 and the X-ray exit aperture pair 153 is such that by the time the work reaches the X-rays from the target 161 it has solidified.

Below the work W a plate or block 163 of shielding material having an aperture 164 for X-rays is disposed. The aperture 164 is disposed in line with the tip 165 of the target 161 which is excited by the X-ray beam so as to receive the resulting X-rays emitted from the work. Below the shielding plate 163 an X-ray film 167 is, advanced in the same direction as the work W and the X-rays emitted by the work are imaged on this film so that the monitoring may be carried out.

The prior-art teaching as to the generation of X-rays and their intensity has concerned itself primarily with vacuum X-ray apparatus. Prior art X-ray generators which operate in an evacuated space are limited to their ratings to electron-beam energy density loadings which would not vaporize or crack the targets, or cause the anode structure to melt or vaporize. Excess volatization of anode material or target produces metallic deposits on the insulating surfaces of X-ray generators and adversely affects their high voltage insulating characteristics. In addition, vapor in regions of the generator having a high electric field gradients causes high-voltage breakdown.

In accordance with this invention the electron-beam is transmitted to a target in the external atmosphere through a series of orifices pairs 179 and 201 (FIG. 6) each of which is differentially pumped as taught by Schopper '556, and is focused onto a solid or liquid X-ray target which may be cooled. The beam in the atmosphere can also be caused to dissipate its energy in a gas or vapor and this way it creates an unusually high-output, large-volume source of X-rays.

It is in an aspect of this invention to subject the target, since it is in the atmosphere, to highly effective cooling not attainable in an evacuated space. A second aspect of this invention is the absence of solid X-ray filtration between the source of X-rays and the object being radiographed. Thirdly, in accordance with the invention, very fine focal spots are achieved using renewable target materials whose geometry defines the size of the effective source of X-rays. Fourthly, the loading may be high because the target can be destroyed and readily replaced.

In the interest of obtaining maximum possible sharpness, in prior-art vacuum radiography, the smallest focal spot (source of X-rays), which delivers the required X-ray output in the required time interval is used. The rotating anode X-ray tube, for example, is a natural consequence of conflicting requirements in medical radiography, i.e., the requirement for a small focal spot in the interest of maximizing radiographic resolution and the need for high X-ray loading to produce the required film darkening in a time interval which is limited by "motion unsharpness" or other time requirements of the application.

One aspect of this invention is the production of a fine spot source (microspot) of X-rays by interposing a fine needle of X-ray target material in the beam leaving the final orifice of the generator. Tungsten, gold, platinum, tantalum, and similar metals of high atomic number are suitable for use as target materials. Other materials are Bi, Pb, Hg, Os, Po, Rh, Th. FIGS. 6 through 18 show various modifications of X-ray generators in accordance with this invention.

Figure 6:
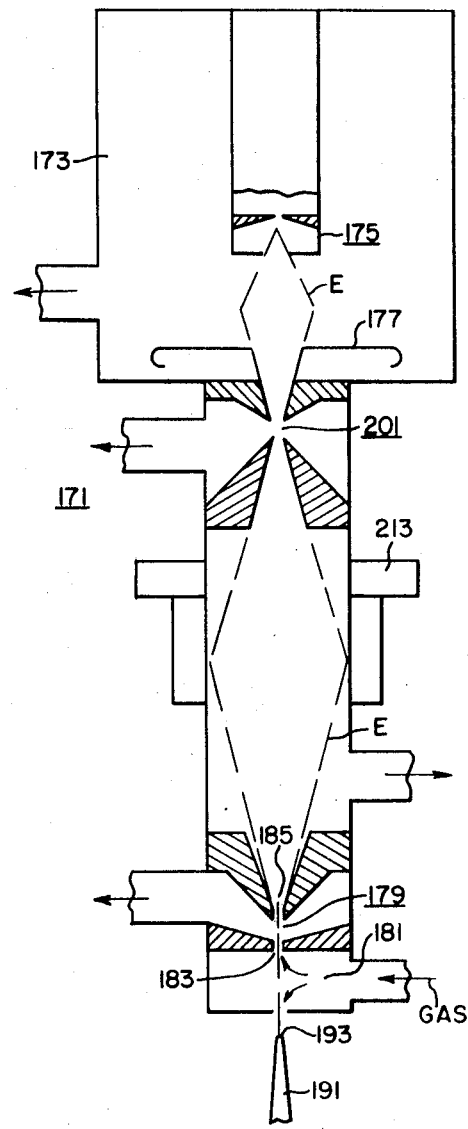
FIG. 6 is a diagrammatic view showing an X-ray generator in accordance with this invention which includes an attenuated target.

The apparatus shown in FIG. 6 includes an electron-beam generator 171 such as is disclosed in the Schopper or Simon-Gerber patents. An electron-beam E (shown having exaggerated width) is generated in an evacuated space 173 between the cathode 175 and anode 177 of this generator and is passed to the atmosphere through a pair 179 of exit apertures (actually having very small diameters but shown exaggerated). Just below the region of the generator 171 through which the beam E passes there is a channel 181 through which a protective gas, for example, helium, flows. This gas prevents the penetration of the vapor emitted from the X-ray target into the fine apertures 183 an 185 of the exit pair 179.

The X-ray target 191 is a needle of very fine wire of X-ray target material, for example, tungsten, tantalum or the like. The impingement of the electron beam E on the tip 193 of this target produces a source of X-rays of very small dimensions; that is substantially a point source. When the apparatus is in use, the X-ray needle 191 may be consumed and its tip 193 continuously moved into renewed X-ray generating relationship with the beam E. The X-ray apparatus is thus capable of producing high-intensity X-rays from and extremely fine spot.

Figure 7:
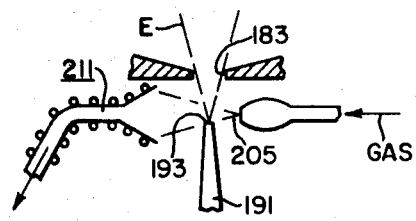
FIG. 7 is a fragmental view generally diagrammatical showing a cross gas-flow mechanism of an X-ray generator of the type shown in FIG. 6.

Typically, as shown in FIG. 6, the fine tungsten wire 191 is bombarded by a high-energy beam fast electrons which emerges into the atmosphere with energies in excess of several thousand watts. Rapid vaporization of the target takes place, cooling the target by absorbing heat of vaporization; the volatilized material is prevented from going into exit orifice of the generator 171 by a; positive flow of gas emanating from an orifice (FIG. 9) just below the exit pair 179, or by a supersonic jet 205 of He or other gas perpendicular to the exit orifice 183 (FIG. 7). An automatic feed system (not shown) is used to keep the end of the tungsten tip at the appropriate location relative to the beam to minimize focal spot jitter. To minimize electron-beam scattering and to prevent oxidation of the tungsten wire, the work area is encased in a plastic cabinet 207 (FIG. 9) filled with He.

X-rays emanate from the bombarded tungsten tip 193 in all directions. X-ray protection in the form of a lead casing (not shown) surrounds the paper thin plastic envelope 207 except in the direction of the object to which the X-rays are directed. The protective housing may be water-cooled when high loadings prevented employed. In into of the object a replaceable plastic window may be employed, permitting quick changeover when the metal coating 9) by tungsten evaporation on the window or excessive filtration of X-rays. The window may be renewed by automatically advancing clean sections from a roll of plastic foil when the window darkening becomes excessive. With high-speed motion of this plastic foil the filtration due to the deposited film of evaporated target material is entirely negligible.

The loading capabilities of a microspot X-ray generator according to this invention as shown in FIG. 6 may be estimated with reasonable accuracy assuming that the energy of the beam is dissipated in evaporation of the target material. The target is assumed to be 0.040 inches or 1 millimeter diameter tungsten wire. The energy necessary to evaporate tungsten is about 1,100 calories or 4,600 joules per gram. This quantity is based on a heat capacity of 5 cal./gram-atom, a latent heat of fusion of 8,400 cal./gram-atom, and a latent heat of vaporization of 185,000 cal./gram-atom. One gram of 1 mm. diameter tungsten wire corresponds to 2.6 inches of wire, the energy necessary to evaporate the wire is $(4,600/2.6)=C1,770$ joules/inch, neglecting heat losses. Thus, a loading of 1,770 watts corresponds to motion of the wire into the beam bombardment zone at a rate of 1 inches/sec. or 0.39 grams/sec. Higher loads are feasible at higher speeds.

Volatilization of tungsten at this rate is entirely impractical in vacuum X-ray generators. In the atmosphere it is feasible. Provision is made to minimize filtration effect arising from the deposited vapor and appropriate water cooling is employed to handle the heat dissipation associated with the deposition of this vapor.

The interaction between the electron beam and the metallic vapors emanating from the target directly above the work is of interest. A cubic centimeter of tungsten gas at NTP (normal temperature and pressure) weighs 8.2 mg. Assuming that the tungsten vapor is at the boiling point, 5,900° C., it is estimated that the density of the gas is reduced by $(5,900/273)=Cx2.6$, yielding an effective hot density of 0.38 mg./cm.$^3$.

The range in tungsten of electrons accelerated by 150 kilovolts is 62 mg./cm.$^2$. The fractional range associated with 1 cubic centimeter volume of tungsten vapor at 5,900° C. is then $(0.38/62)=\Phi\sim0.006\ _{mg}$. It is estimated that the energy loss of a 150 kv. beam in traversing 1 cm. of tungsten gas at the boiling temperature is substantially less than 5 percent of the available beam energy. Thus negligible losses in the energy of the beam occurs if the target is located within a centimeter or two of the beam nozzle.

The interaction of the metal vapors of the target with the beam can be minimized by providing the supersonic jet 205 (FIG. 7) of gas at the target. The jet is perpendicular to the beam E and drives the vapors out of the path of the beam. These vapors can be blown into a water cooled funnel-shaped exhaust system 211 to minimize the interaction of vapor with beam and to help free system from metallic vapors.

The diameter of the tungsten wire 191 (FIG. 6) can be larger than the focused diameter of the cross section of the beam at the tip 193 which the beam impinges upon the target wire 191. In this case the focal spot size of the X-rays is determined by the size of the beam as it impinges upon the target. The larger size wire aides in dissipating beam power.

The target wire 191 can also be of considerably smaller diameter than the cross section of the beam. The dimensions of the focal X-rays spot is then determined by the diameter of the wire, and fine spot size is limited only by the availability of fine wire of the desired target material.

In the preferred use of a microspot X-ray generator according to this invention, as shown in FIGS. 6 and 7, the focusing coil 213 is set to set the diameter of the beam R substantially equal to the diameter by the above calculations. For example, 1 gram of 0.3 mm. tungsten wire is 29 inches long. Thus a loading of 4,600 watts requires a wire speed just exceeding 2 ft./sec. This compares with loading of only 1,600 watts to derive a 0.3 mm. focal X-ray spot in a prior art rotating anode X-ray generator but the time duration of the loading on this spot is only 0.1 sec.

In addition to increasing the resolution, the microspot generator according to this invention, because its X-rays are emitted from a fine spot, can be used in radiography and fluoroscopy with geometrical factors which make for magnification of the image. This is accomplished by shorter spacing between the focal spot and the work and longer spacing from the work to the film or the image sensing device (FLUREX apparatus) than in prior art apparatus. Because of the high X-ray output from the microspot, it is possible to use relatively insensitive X-ray imaging devices such as the X-ray vidicon apparatus. Because of the magnified image, it is possible to use X-ray image intensifiers and still maintain high resolution capabilities.

Figure 8:
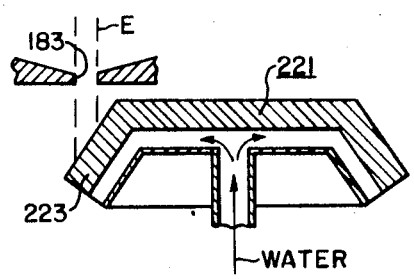
FIG. 8 is a fragmental diagrammatical view showing an X-ray generator constituting a modification of this invention and including a rotating, cooled target.

In the FIG. 8 apparatus a rotating target 221 serves in lieu of the needle target 191 of the FIG. 6 apparatus. The target 221 is a disc with a tapered periphery 223 on which X-ray target material is deposited. This periphery passes through the electron beam E which emerges into the atmosphere. The target is rotated by a motor (not shown) and is liquid cooled.

Since the target 221 is in the practice of this invention in the external atmosphere, the lubrication problem of the vacuum rotating-anode X-ray tube does not exist. There is no need to subject the target to the outgassing processes required by these prior-art X-ray tubes during their exhaust.

The target diameter (i.e., diameter of the rotating member) can be as large as necessary to handle desired loadings. Extremely fine spots of unusual loading capabilities are feasible using rotating anode techniques in the practice of this invention.

As an example of possible loading of a given external rotating anode apparatus (FIG. 8) a water-cooled tungsten target of diameter $d$ is assumed. The range of 150 kv. accelerated electrons in tungsten is 62 mg./cm$^2$, corresponding to a depth of 1.25 mils. As a reasonable approximation it is assumed that the volume of beam penetration associated with one complete rotation of target equals $\pi dtr$ where $d$ is the diameter of beam loading, $t=0.1$ cm., is the width of spot and $r=$range of 150 kv. electrons $=3.7\times10^{13}$ cm. The weight of the volume of tungsten penetrated in a single revolution for a 1-foot-diameter target is $\pi dtr$ (19.3) 0.585 grams. It takes about 230 joules to heat 1 gram of tungsten to 2,000° C. Then $(0.585)(230)=135$ joules to heat the penetrated annular circle 223 of tungsten. It is a reasonable assumption that by water cooling the heat impressed into the tungsten during the interims between exposure to the beam as the target rotates continuously can be dissipated. Then the power dissipated is given by $P=135\,R$ where $R$ is the number of revolutions per second. Thus, for 3,600 r.p.m. of 60 revolution per second, the anticipated dissipation is 8,100 watts for a 1-foot-diameter target and beam E of 1 mm. diameter.

The area of the directly heated disc 223 of tungsten is $\pi dt$, or about 1.5 square inches. The water-cooling system must dissipate 81,00 watts in a 1-foot-diameter circle having an area of 1.5 square inches. It is readily possible to achieve this cooling with less than a gallon per minute water flow.

The above calculations neglect lateral flow of heat and thus are conservative. By using appropriate designs, increasing the diameter or flow, much higher ratings can be achieved. Relatively low-cost targets can be used which can quickly and readily be replaced when required or desired.

The X-ray generator in accordance with this invention is also admirably suited for X-ray diffraction investigations since the material of the target 191 can be readily changed without necessitating any pumpdown procedures. A wide variety of targets for X-ray diffraction investigations, including liquid and gaseous targets can be used. Because of the fineness of the apertures (shown exaggerated) of the orifice pairs 179 and 201, through which the electrons pass, and the high speed flow of gas from atmospheric pressure to the high vacuum region of the gun, the diffraction target is not contaminated by material evaporated from the electron source within the high vacuum chamber; a common cause of difficulties in the use of prior-art vacuum systems for diffraction investigations. A pure uncontaminated target surface 193 is then assured. Because of the unusual geometry, solid, liquid, and gaseous targets are used; thus radially opening up the number of X-ray diffraction lines which may be employed for X-ray diffraction work.

The use of the very fine spot assures higher X-ray output through the collimating system of the X-ray camera. This fact coupled with the higher output results in the facility for exposing X-ray diffraction films. As a result of the higher output, it is also possible to observe the X-ray diffraction images directly on image intensifying apparatus.

The apparatus according to this invention can also be used to produce X-rays by transmission through thin foil targets or wires having a direction of motion particular to the direction of the beam. For the production of X-rays by transmission a foil target material is necessary which has a thickness of the order of the electron range in the material. The foil should be moved at very high speed. For moderate loadings the foil can be reused. For high electron beam loadings the material where the electrons impinge is melted or vaporized and cannot be reused; the metal, if costly, can be salvaged.

An X-ray microspot can be achieved by confining the source of X-rays i.e., the target to a very small area, for example, the fine wire 191 of FIG. 6. In recent successful X-ray work it was found that excellent radiographs can be produced with this technique at relatively low loadings. The tip 193 of a 0.025-inch tungsten wire was used as the X-ray target source, with the nonvacuum beam generator 171 operating at 130 kv., 4 ma. for a 40 second exposure. Images of welds showed small porous regions of the work.

Figure 9:
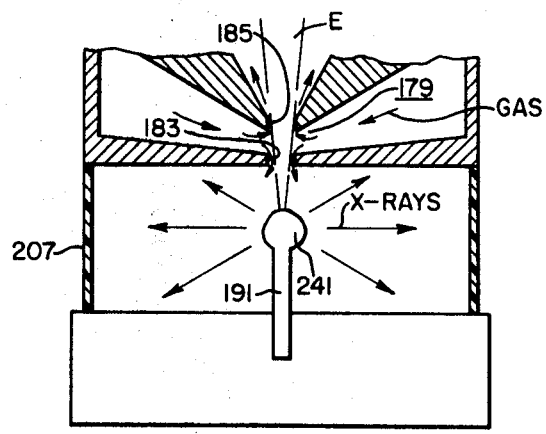
FIG. 9 is a fragmental diagrammatic view showing a feature of the generator shown in FIG. 6.

It has been found that as the electron-beam powerloading on the wire target 191 is increased the tip of the tungsten wire tends to melt and forms a ball 241, as shown in FIG. 9. The molten tip of the wire balls up into a sphere, an ideal shape for heat dissipation by means of vaporization and radiation. Heat is also dissipated by conduction through the wire. Since the X-ray source is of very fine size and exposed to the atmosphere, it is possible to use an aperture of very fine size in close proximity to this source of X-rays to restrict further the size of the X-ray source to a small diameter. A defining aperture can be produced, by conventional machining methods, or through the use of electrical-discharge-machining, electron-beam drilling, or by special casting techniques. By electrical-discharge-machining techniques holes as fine as 0.005 inches in Ta plates have been produced.

Figure 10:
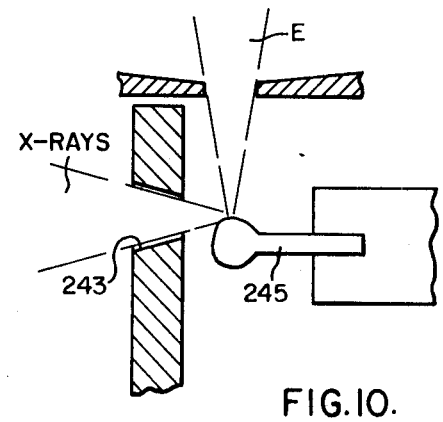
FIG. 10 is a fragmental diagrammatic view showing a X-ray generator of the type shown in FIG. 6 with an aperture for reducing the extent of the X-ray beam.

FIG. 10 shows a combination system on which an X-ray beam defining aperture 243 limits the size of the source of X-rays. It is desirable that the X-ray source dimensions shall be limited while at the same time, the X-ray-limiting aperture shall be near the source of X-rays so as to avail an adequate angle of X-rays to cover the workpiece being radiographed. The ability to limit the size of the X-ray source by an X-ray-limiting aperture is a desirable attribute of the X-ray generator according to this invention and is a direct consequence of the fine-dimension-target that can be used. This cannot be achieved with a conventional target which must have adequate dimensions to dissipate the heat. High melting point metals, such as Ta, are then preferably used as the material for the aperture 243. High-atomic-number, high-density, high thermal conduction, and stability, when hot, are desireable attributes for both at the target 245 and aperture materials. Ta qualifies on all counts. Ta has an advantage over tungsten that it does not volatilize (and oxidize in the presence of air) as readily as tungsten.

Figure 11:
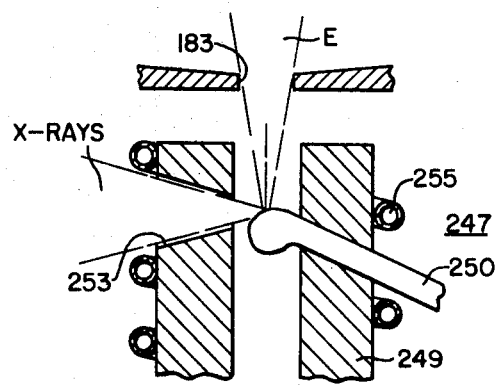
FIG. 11 is a fragmental diagrammatic view of an X-ray beam generator with an aperture of a different structure than is shown in FIG. 10.

FIG. 11 shows an apertured target assembly 247 in which the support 249 for the target wire 250 and the X-ray defining aperture 253 are confined in a liquid-cooled cylinder 255. Ta is a preferred material for both apertures 253 and wire target 250. The Ta wire can be pushed into X-ray generating engagement with the beam E as it is used up, or it can be replaced at appropriate intervals. The Ta wire 250 can be fed automatically into the enclosure and the speed of the X-ray radiation kept constant in space.

Where a microspot is produced by the combination of a wire target of high atomic number and a microlimiting aperture to limit the X-ray beam, it is advantageous to interpose an electron-beam limiting aperture into the beam leaving the generator to reduce the nonuseful power dissipated near the target. Significant scattering is caused by the gas between the workpiece and the target and the beam size would otherwise be larger than it needs to be for a microtarget. The result is that less power needs to be dissipated from the combination wire target and limiting aperture.

It has been found desirable to add a small tantalum block within a small defining aperture in the path of the beam E; this block greatly limits the size of the issuing beam. In the work conducted to date with this additional aperture in alignment with the exit orifice pair 179 of the generator 171, it has been observed that microbeams are formed which visually are substantially smaller than the beam that normally emerges from the generator without this extra limiting aperture. The dimensions of a typical such outside aperture 251 are shown in FIG. 12.

Figure 12:
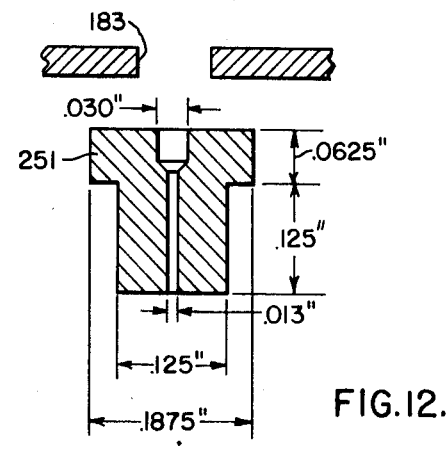
FIG. 12 is a diagrammatic fragmental view showing the dimensions of a limiting aperture interposed in the path of the electron beam of an X-ray generator such as is shown in FIG. 6.

Beam loading as high as 130 kv. and 10 ma. have been impressed through such an orifice machined into small Ta block having the dimension shown in FIG. 12, without water cooling. There is an indication that the beam defines its own aperture in going through the Ta hole. The fact that the small Ta block can be utilized as a beam-defining aperture for the beam operating at 1.3 kw. indicates that a high percentage of the energy emerges through this additional aperture; if the energy were absorbed the block 251 would greatly overheat without water cooling.

An aperture may serve as an X-ray target. Such an aperture X-ray target is here defined as an X-ray source consisting of an orifice in the beam orifice system which is grazed by defocusing the electron beam. The aperture-target technique has the low filtration advantages of the above-disclosed structures since with the orifice near the atmospheric side of the unit the X-ray beam emerges into the atmosphere side of the unit without going through a window seal. The source of X-rays can be made as small as desired by restricting the diameter of the aperture. With an X-ray beam of this low intensity the gas interposed in the path of the beam may be of low atomic number such as He or $H_2$ when it is used for radiographic or crystallographic analysis purposes. The soft X-rays as well as the hard X-rays are not absorbed by this gas and are available for impingement on the specimen. Similarly the pressure of the gas on the path of the X-rays can be reduced and the hard and soft X-rays preserved in this way even with a low power source.

In the practice of this aspect of this invention a radiograph was produced by defocusing the beam so that it impinged on the entrance aperture 185 of the exit pair 179 of apparatus such as is shown in FIG. 6. The work radiographed was placed on a film disposed on the floor some 32 inches distant from the bottom nozzle of the gun of FIG. 6.

To obtain a smaller diameter orifice target, the Ta orifice 251 shown in FIG. 12 was mounted under the exit orifice 183 of the pair 179 in optical alignment with the orifice pair 179. The X-ray target consisted of that portion of the orifice system which was grazed by electron beam E. Any Ta metal present within the orifice which was vaporized from the sides of the orifice served to increase the output efficiency of the X-ray source. By going up in beam energy a copious supply of Ta vapor could be produced and utilized as a supplementary source of X-rays. Radiographs were produced by X-rays from the orifice 251.

0.013-inches further modification in which the 0.013 inches tantalum orifice 251 is replaced by a smaller 0.013-inches orifice also proved to be satisfactory. Pinhole pictures indicated that the size of the X-ray source decreased proportionately.

The use of an orifice as a radiographic target results in a collimated source of X-suitable for diffraction work in which the X-rays originate in a low-atomic-number gas such as He and are conducted through an O-ring gasketed collimator system to the specimen under test. The entire system, including the collimated source, the crystal and the film can be maintained in the low-atomic-number gas, or at relatively low pressures, thus making it possible to perform very arcuate X-ray diffraction studies using long wavelength X-rays. Since the nozzle target can be at atmospheric pressure targets and target materials are readily interchanged.

For materials of high vapor pressure, the vapor issuing from the heated parts can serve as the target, or source of X-rays. Such a system, particularly if it is used under partial vacuum pressures, operates with greatly minimized pumping requirements, is compact, inexpensive, small in size, and readily reproducible. It has the additional advantage that the beam originates in high vacuum and is fully protected at all times.

Figure 13:
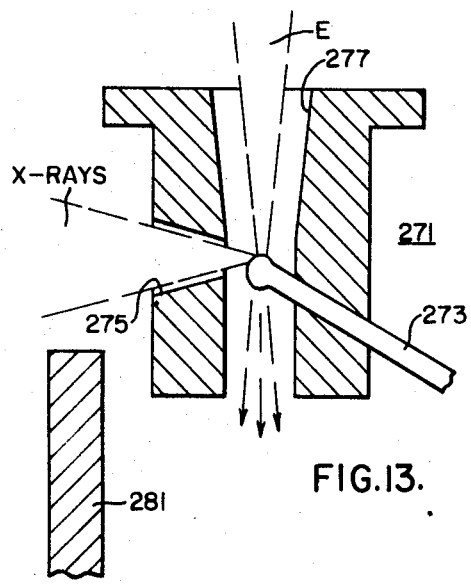
FIG. 13 and 14 are fragmental diagrammatical views similar to FIG. 11 but showing apertures of different types.
Figure 14:
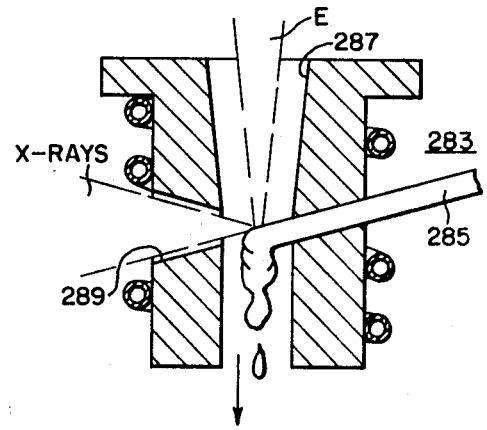
Figure 15:
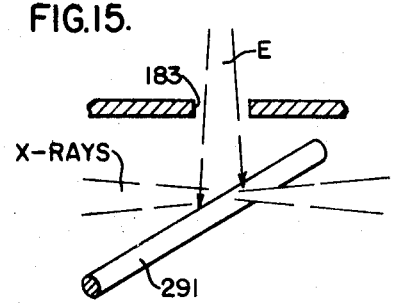
FIG. 15 is a fragmental diagrammatic view showing an X-ray generator in accordance with a modification of this invention in which the target is the surface of a wire of target material.
Figure 16:
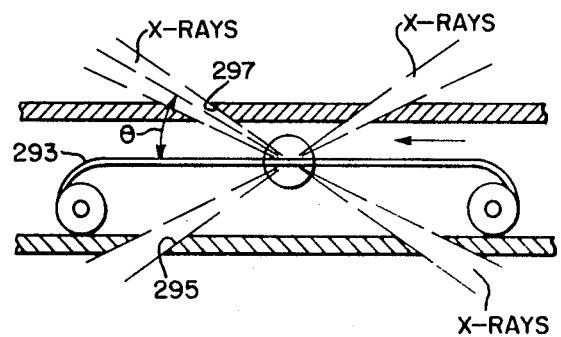
FIG. 16 is another fragmental diagrammatic view showing another X-ray generator in accordance with a modification of this invention in which the target is a movable ribbon or wire.

FIG. 13 shows an X-ray-target assembly 271 which combines features of the above-discussed structures in a single integral unit that can be mounted on or near the exit orifice 183 of the generator 171. The assembly includes a small-diameter Ta rod 273, an X-ray limiting aperture 275 and an electron-beam-limiting aperture 277. After a welding operation this assembly (which may be water-cooled) can readily be installed onto the gas protection nozzle of the generator 171 so that the new orifice is aligned with the orifice system 179 of the welding generator. The target 273 of this assembly can be mounted in suitable position within the electron-beam-limiting aperture 277 of the orifice in close proximity to an X-ray limiting aperture 275 which may be machined into the side of the orifice. Useful X-rays can be removed either through limiting aperture on the side, or alternatively out of the bottom of the nozzle. Additionally a lead protective screen 281 is provided to remove as a radiographic factor any unrequired X-rays such as would be emitted from the bottom of the nozzle if useful X-rays are derived through a limiting aperture 275 on the side. Ta is a preferred material although any of the high atomic materials can be employed. FIG. 14 shows a target assembly 283 in which high loading is achieved by melting the wire target 285 and permitting the vapor and liquid to flow out of the bottom of the orifice 287 and the vapor in part to flow through the X-ray limiting aperture 289 on the side of the assembly. FIGS. 15 and 16 show apparatus in which a wire target 291 or 293, preferably Ta, moves in the path of the beam E. The wire 291 can be of as small diameter as feasible, and the electron beam may be limited by apertures to correspond. The wire diameter limits the size of the beam in all respects except longitudinal of the wire. To decrease the width of the spot, X-ray defining apertures 295 and 297 (FIG. 16) are introduced to limit the angle out of which useful X-ray can be withdrawn from the system, as shown in FIG. 16.

Assume that the width of the aperture is $\omega$ and that the angle of the line through the spot and the center of the aperture to the plane of the aperture is $\theta$ (see FIG. 16). The effective width of the spot instead of being $\omega$, the width of the X-ray beam, is now $\omega \sin \theta$. Thus if a 0.010 inch-diameter spot is desired, an 0.040 inch apertures at an angle of $\theta=14°$ can be used.

Figure 17:
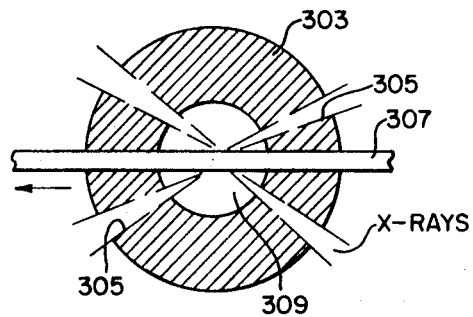
FIG. 17 is a fragmental diagrammatic view in bottom elevation, looking up to the exit aperture of an electron-beam generator, showing another target-aperture combination which may be included in apparatus as shown in FIG. 6.

An aperture cylinder 303 having a plurality of X-ray-limiting apertures 305 is shown in FIG. 17. The target wire 307 passes transversely through radial openings in the cylinder 303. The apertures 305 are tapered radial openings each at an angle to the wire 307. The cylinder 303 is coaxial with the electron beam which impinges on the wire through the axial opening 309 in the cylinder. The wire 307 is heated by the beam and its exit temperature depends on its initial temperature, its speed, electron-beam loading, and the extent of liquidation and vaporization of the wire.

A rough calculation has indicated that about 1,100° C. temperature rise results where 1,500 watts of power is impressed on a 0.010 inch Ta wire moving at about 30 ft./min. If desired the hot Ta can be immersed in a liquid coolant and then returned for refuse as part of single loop, or the Ta wire can be discarded as used in which case the permissible temperature rise of the wire more than doubles the electron-beam load for the 30 ft./min. speed of wire described above.

An alternative technique which can be used if the wire is to be discarded is to permit the wire to melt and vaporize within the orifice. It can then be flushed out through the bottom of the orifice by the pressure of a protective gas. This mode of operation decreases the amount of Ta required to dissipate a given power input by a substantial amount since the heat of fusion of Ta adds about 174 joules/gram of liquid metal produced. Alternatively the Ta can be partially vaporized in each pass through the orifice. This greatly reduces the required speed for traversing the orifice and eliminates the problem of getting rid of molten Ta from the region of the orifice.

Figure 18:
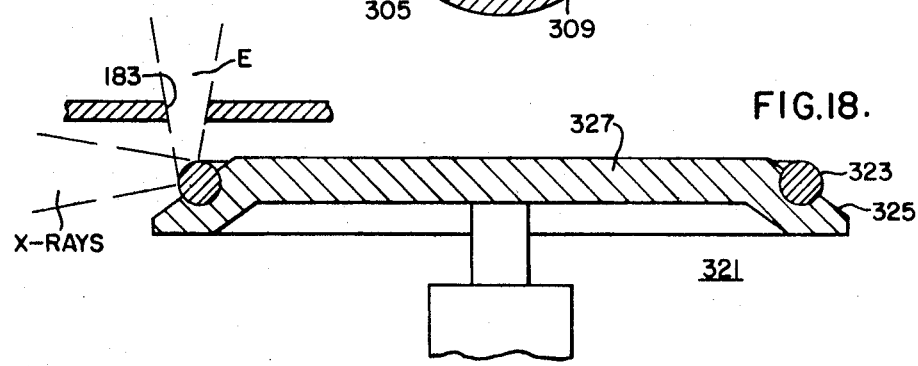
FIg. 18 is a fragmental diagrammatic view showing another target structure which may be included in apparatus as shown in FIG. 6.

Another target assembly 321 is shown in FIG. 18. A wire 323 of Ta or a similar material is snapped into a groove in the tapered periphery 325 of a rotatable disc 327. The beam impinges on the wire 323. The support structure can be fabricated of Ta, copper, or other minerals which can be readily water cooled and rotated to equalize the thermal loading. The wire 323 can be replaced whenever the quantity of tantalum is insufficient to perform its radiographic function.

Figure 19:
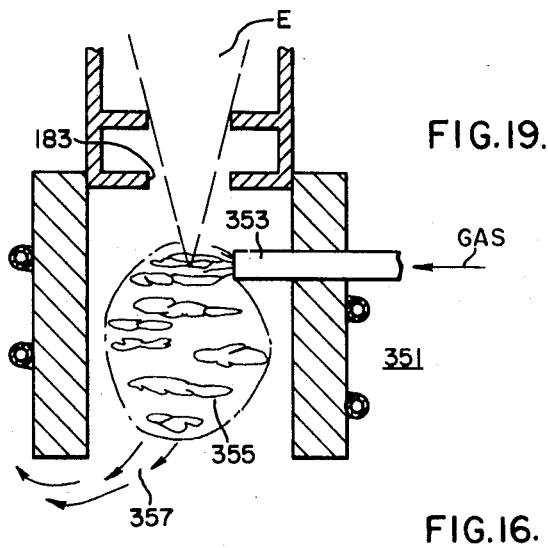
FIG. 19 is a fragmental diagrammatic view showing apparatus similar to that of FIG. 6 in which the X-ray target is gaseous.

In the apparatus shown in FIg. 19 the electron-beam E is transmitted into a liquid-cooled chamber 351 of a material such as aluminum or copper. The chamber 351 is penetrated by a nozzle 353 through which a gas 355 is projected into the path of the beam E. Typically the gas may be a high-atomicnumber gas, such as argon or xenon or $UF_6$, or a vapor of a high-atomhnumber metal such as lead. The beam E impinging on the gas or vapor produces X-rays which may be used for such purposes as sterilization. Where the chamber 351 is of aluminum the X-rays are emitted in all directions; an aperture may be provided in a copper chamber 351 or the X-rays may be derived from the open bottom 357 of the chamber. The gas is heated by the X-rays and the chamber includes a flue through which the gas or vapor escapes. Because the heated gas is renewed continuously the loading capabilities of this apparatus are very high.

While preferred embodiments of this invention have been disclosed herein, many modifications thereof are feasible. This invention then, is not to be restricted, except insofar as is necessitated by the spirit of the prior art.

I claim as my invention:

1. The method of welding work with an electron beam, which comprises projecting said beam on said work in welding relationship with said work, producing X-rays with said beam, producing X-ray images of said welds with said X-rays and as said welding progresses, monitoring, by observation of said images, the soundness of the welds produced by said beam with said X-rays after the welding of said welds is completed.

2. The method of claim 1 wherein the monitoring X-rays are the X-rays produced by the beam while in welding relationship with the work and that for monitoring these X-rays are transmitted through a pinhole to produce the X-ray images.

3. The method of claim 1 wherein the beam is produced in a vacuum chamber and the beam is transmitted outside of said chamber in welding relationship with the work which is also outside of the chamber and the beam also produces the monitoring X-rays outside of the chamber.

4. The method of welding work with an electron beam, which comprises projecting said beam on said work in welding relationship with said work, producing X-rays with said beam, and as said welding progresses, monitoring the soundness of said welds produced by said beam with said X-rays after the welding of said welds is completed, the work and welding beam being moved one relative to the other while the work is being welded and the monitoring X-rays being produced intermittently and the welding being interrupted for predetermined intervals of time while said X-rays are produced and the soundness of the weld being monitored, the said intervals being so short that taking into consideration the speed of said relative movement and the thermal conductivity of the work the weld produced is continuous and the temperature of the region being welded does not change materially by reason of said interruption.

5. The method of welding work with an electron beam, which comprises projecting said beam on said work in welding relationship with said work, producing X-rays with said beam, and as said welding progresses, monitoring the soundness of said welds produced by said beam with said X-rays after the welding of said welds is completed, the work and welding beam being moved relative to each other and the monitoring X-rays being produced by deflecting the beam away from welding relationship with the work to an X-ray target the welding beam engaging each element of the work before the X-ray beam as the relative movement progresses and the spacing between the points of engagement of the welding beam and the work and the X-ray beam and the work being such that the work is solidified when it is engaged by the X-ray beam.

6. The method of welding work with an electron beam, which comprises projecting said beam on said work in welding relationship with said work, producing X-rays with said beam, and as said welding progresses, monitoring the soundness of said welds produced by said beam with said X-rays after the welding of said welds is completed, the monitoring X-rays being produced separately from the X-rays resulting from the projection of the beam in welding relationship with the work.

7. Welding apparatus for continuously welding work including an evacuated container, first and second electron beam generators within said container for generating a first electron beam and a second electron beam respectively, means for projecting said first beam on said work in welding relationship with said work, an X-ray target, means for projecting said second beam on said target in X-ray generating relationship with said target, means for projecting the X-rays generated at said target through the weld produced in said work by said first beam, and means for producing an image of the resulting X-rays emitted by said weld.

8. The apparatus of claim 7 wherein the work and the target are both in the atmosphere outside of the container and the container includes first and second aperture means for transmitting the first and second beams respectively to said work and said target respectively.

9. An X-ray generator including an evacuated container, means for producing a beam of electrons within said container, a member of X-ray target material in the atmosphere outside of said container, means including aperture means in said container for projecting said beam in X-ray generating relationship with a portion of said member, the power of said beam being such as to consume the portion of said member impinged by said beam, and means connected to said member for advancing additional portions of said member into X-ray generating relationship with said beam to replace the consumed portions.

10. The generator of claim 9 wherein the member is a wire and the projecting means projects the beam on the end of said wire and the advancing means advances the wire to maintain its end in X-ray generating relationship with said beam as the wire is consumed by the heat generated by said beam.

11. The generator of claim 9 wherein the member is an attenuated member and the beam impinges on renewed portions of the surface of said member as said member is advanced.

12. The generator of claim 9 wherein the target is a continuously renewable gas of high atomic number.

13. The generator of claim 9 wherein the X-rays from the target are limited by an aperture near to the target.